United States Patent
Zhang et al.

(10) Patent No.: US 12,005,805 B2
(45) Date of Patent: Jun. 11, 2024

(54) BATTERY REPLACEMENT DEVICE AND CONTROL METHOD THEREFOR

(71) Applicant: AULTON NEW ENERGY AUTOMOTIVE TECHNOLOGY GROUP, Shanghai (CN)

(72) Inventors: Jianping Zhang, Shanghai (CN); Wencheng Lu, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 647 days.

(21) Appl. No.: 17/262,193

(22) PCT Filed: Jul. 23, 2019

(86) PCT No.: PCT/CN2019/097282
§ 371 (c)(1),
(2) Date: Aug. 18, 2021

(87) PCT Pub. No.: WO2020/020151
PCT Pub. Date: Jan. 30, 2020

(65) Prior Publication Data
US 2021/0380018 A1 Dec. 9, 2021

(30) Foreign Application Priority Data

| Jul. 23, 2018 | (CN) | 201810812451.3 |
| Jul. 23, 2018 | (CN) | 201810812454.7 |
| Jul. 23, 2018 | (CN) | 201810817900.3 |

(51) Int. Cl.
*B60L 53/80* (2019.01)
*B60R 25/102* (2013.01)

(52) U.S. Cl.
CPC ............ *B60L 53/80* (2019.02); *B60R 25/102* (2013.01); *B60L 2250/10* (2013.01);
(Continued)

(58) Field of Classification Search
CPC .. H02J 7/00; H02J 7/0049; H02J 7/122; H02J 9/06; H02M 7/44; G06F 19/00;
(Continued)

(56) References Cited

U.S. PATENT DOCUMENTS 6,545,445 B1 * 4/2003 McDermott ........ F02N 11/0866
320/103
2010/0145717 A1 6/2010 Hoeltzel
(Continued)

FOREIGN PATENT DOCUMENTS

| CN | 101887985 A | 11/2010 |
| CN | 102167015 A | 8/2011 |

(Continued)

OTHER PUBLICATIONS

NPL Search (Oct. 5, 2023).*
(Continued)

*Primary Examiner* — Van T Trieu (57) ABSTRACT

Disclosed are a battery replacement device (1") and a control method therefor. The battery replacement device (1") is used for mounting a battery on an electric vehicle, and sending a security message to a battery lock (2") to unlock the battery, so that the battery is electrically connected to the electric vehicle.

16 Claims, 4 Drawing Sheets

(52) U.S. Cl.
CPC ....... *B60L 2250/16* (2013.01); *B60L 2270/34* (2013.01); *B60R 2325/108* (2013.01)

(58) Field of Classification Search
CPC ... G01R 31/36; B60L 3/00; B60L 3/12; B60L 11/00; B60L 11/02; B60L 11/18; B60L 53/00; B60L 53/30; B60L 53/305; B60L 53/62; B60L 53/66; B60L 53/68; B60L 53/80; B60R 25/102; B60W 20/00

See application file for complete search history.

(56) References Cited

U.S. PATENT DOCUMENTS

| | | | |
|---|---|---|---|
| 2016/0009255 | A1 | 1/2016 | Droste |
| 2017/0355274 | A1 | 12/2017 | Ger |
| 2019/0207268 | A1* | 7/2019 | Lai ...................... H01M 10/482 |
| 2019/0299803 | A1* | 10/2019 | Cheng .................... B60L 53/16 |
| 2021/0103292 | A1* | 4/2021 | O'Hara ................ G05D 1/0027 |

FOREIGN PATENT DOCUMENTS

| | | |
|---|---|---|
| CN | 105245510 A | 1/2016 |
| CN | 110745109 A | 2/2020 |
| CN | 110816360 A | 2/2020 |
| CN | 110816488 A | 2/2020 |
| JP | 2000090349 A | 3/2000 |
| JP | 2010526697 A | 8/2010 |
| JP | 2014533480 A | 12/2014 |
| JP | 2018505637 A | 2/2018 |
| JP | 2018072241 A | 5/2018 |
| WO | 2013016554 A3 | 1/2013 |
| WO | 2015036446 A | 3/2015 |

OTHER PUBLICATIONS

First Office Action dated Jan. 4, 2022 issued in Chinese Patent Application No. 201810817900.3.
May 25, 2022 Second Office Action issued in Chinese Patent Application No. 201810817900.3.
Oct. 9, 2019 International Search Report issued in International Patent Application No. PCT/CN2019/097282.
Oct. 9, 2019 Written Opinion of the International Searching Authority issued in International Patent Application No. PCT/CN2019/097282.
Jul. 4, 2023 First Office Action issued in Japanese Patent Application No. 2021-504172.
Jan. 16, 2024 Second Office Action issued in Japanese Patent Application No. 2021-504172.
Apr. 9, 2024 First Office Action issued in Korean Patent Application No. 10-2021-7005150.

* cited by examiner

BATTERY REPLACEMENT DEVICE AND CONTROL METHOD THEREFOR

The present application is a National Stage of International Application No. PCT/CN2019/097282, filed on Jul. 23, 2019, which claims priority of the Chinese Patent Application No. 201810812451.3 filed on Jul. 23, 2018, Application No. 201810812454.7 filed on Jul. 23, 2018 and Application No. 201810817900.3 filed on Jul. 23, 2018, the contents of which are incorporated herein by reference in their entireties.

TECHNICAL FIELD

The present disclosure relates to the technical field of battery replacement for electric vehicles, and especially relates to a battery replacement device and its control method.

BACKGROUND

At present, battery replacement vehicles are operated in two ways, one is to replace a battery at a replacement station, and the other is to charge the battery by users. With the increase of operating hours, battery performance is declining, and in order to maintain operating capacity, the replacement station will add new batteries at any time. That is to say, the performance quality of the battery replaced from the replacement station will be maintained at a high level.

Driven by profit, the vehicles operated by users will use inferior batteries in private to replace the higher-quality batteries installed in the replacement station. At present, due to the lack of detection and control of the battery replacement behavior of electric vehicles, it is impossible to judge whether the battery replacement behavior of electric vehicles meets the operating standards, and it is impossible to effectively avoid the situation that the battery is incorrectly or unauthorizedly replaced. The replacement of inferior batteries, on the one hand, has security risks for the operation of the vehicles, and on the other hand, will cause losses to the electrical replacement station.

CONTENT OF THE PRESENT INVENTION

The technical problem to be solved in the present disclosure is for overcoming the defect of lack of supervision of the electric vehicle battery replacement behavior and unavoidability of the battery is unauthorizedly or incorrectly replaced in the prior art, and to provide a battery lock and a control method thereof.

The present disclosure solves the above-mentioned technical problems through the following technical solutions:

The present invention provides a battery lock, wherein the battery lock is applicable for battery replacement of electric vehicles;

the battery lock is used to unlock the battery when receiving a security message sent by an external device, so that the battery is electrically connected to the electric vehicle.

Preferably, the battery lock comprises: a sending unit;
the sending unit is used to send an acquired battery lock signal to the external device to generate the security message;
the battery lock signal is used to indicate that the battery is installed on the electric vehicle.

Preferably, the battery lock further comprises a storage unit;
the storage unit is used to store the security message.

Preferably, the battery lock further comprises: a receiving unit and a locking unit;
the receiving unit is used to invoke the locking unit when receiving a battery unlock signal;
the locking unit is used to lock the battery so that the battery is electrically disconnected from the electric vehicle;
the battery unlock signal is used to indicate that the battery is removed from the electric vehicle.

Preferably, after locking the battery, the locking unit is further used to invoke the sending unit;
the sending unit is further used to send the security message to the external device.

Preferably, the battery lock is arranged in the electric vehicle;
and/or, the external device is a battery replacement device or a battery replacement station.

The present invention further provides a control method of a battery lock, wherein the battery lock is applicable for battery replacement of electric vehicles;
the control method comprises:
the battery lock unlocks the battery when receiving a security message sent by an external device, so that the battery is electrically connected to the electric vehicle.

Preferably, before the step of receiving a security message sent by an external device by the battery lock, the control method further comprises:
the battery lock sends the acquired battery lock signal to the external device to generate the security message;
the battery lock signal is used to indicate that the battery is installed on the electric vehicle.

Preferably, after the step of the battery lock unlocks the battery, the control method further comprises:
the battery lock stores the security message.

Preferably, before the step of receiving a security message sent by an external device by the battery lock, the control method further comprises:
when the battery lock receives a battery unlock signal, the battery lock locks the battery so that the battery is electrically disconnected from the electric vehicle;
the battery unlock signal is used to indicate that the battery is removed from the electric vehicle.

Preferably, after the step of locking the battery, the control method further comprises:
the battery lock sends the security message to the external device.

The present invention further provides a battery replacement device for replacing a battery of an electric vehicle, wherein the battery replacement device is used to install the battery on the electric vehicle and send a security message to a battery lock to unlock the battery, so that the battery is electrically connected to the electric vehicle.

Preferably, the battery replacement device comprises: a receiving unit and a message generating unit;
the receiving unit is used to invoke the message generating unit when receiving a battery lock signal sent by the battery lock;
the message generating unit is used to generate the security message;
the battery lock signal is used to indicate that the battery is installed on the electric vehicle.

Preferably, the battery replacement device further comprises: a removing and installing unit;
the removing and installing unit is used to remove the battery from the electric vehicle.

Preferably, the battery replacement device further comprises: a verification unit;

after the battery is removed, the verification unit is used to obtain and verify the security message of the battery lock, and when the verification is successful, send a security signal to the battery replacement device.

Preferably, the battery replacement device further comprises: an alarm unit;

the verification unit is further used to invoke the alarm unit when the verification is not successful;

the alarm unit is used to generate an alarm information.

Preferably, the verification unit is further used to verify a user identity and an identifier of a target battery when receiving the unlock request, and send the security message to the target battery when the verification is successful;

the unlock request comprises the user identity and the identifier.

The present invention further provides a control method of a battery replacement device, the battery replacement device for replacing a battery of an electric vehicle, wherein the control method comprises:

the battery replacement device installs the battery on the electric vehicle, and sends a security message to a battery lock to unlock the battery, so that the battery is electrically connected to the electric vehicle.

Preferably, before the step of sending a security message to a battery lock, the method further comprises:

the battery replacement device generates the security message when receiving the battery lock signal sent by the battery lock;

the battery lock signal is used to indicate that the battery is installed on the electric vehicle.

Preferably, before the step of the battery replacement device installs the battery on the electric vehicle, the control method further comprises:

the battery replacement device removes the battery from the electric vehicle.

Preferably, after the step of the battery replacement device removes the battery from the electric vehicle, the control method further comprises:

the battery replacement device obtains and verifies the security message of the battery lock, and when the verification is successful, generates a security signal and sends it to a battery charging device.

Preferably, the battery replacement device generates an alarm information when the verification is not successful.

Preferably, the control method further comprises: when the battery replacement device receives an unlock request, it verifies a user identity and an identifier of a target battery, and sends the security message to the target battery when the verification is successful;

the unlock request comprises the user identity and the identifier.

The present invention further provides a battery replacement encryption system for battery replacement of electric vehicles, the battery replacement encryption system comprises: a battery replacement device and a battery lock;

the battery replacement device is used to install the battery on the electric vehicle and send a security message to the battery lock;

the battery lock is used to unlock the battery when receiving the security message, so that the battery is electrically connected to the electric vehicle.

Preferably, the battery lock is further used to obtain a battery lock signal and send it to the battery replacement device;

the battery lock signal is used to indicate that the battery is installed on the electric vehicle;

the battery replacement device is used to generate the security message when receiving the battery lock signal.

Preferably, the battery lock is further used to store the security message.

Preferably, the battery replacement device is also used to remove the battery from the electric vehicle;

the battery lock is further used to lock the battery when obtaining a battery unlock signal, so that the battery is electrically disconnected from the electric vehicle;

the battery unlock signal is used to indicate that the battery is removed from the electric vehicle.

Preferably, after the battery is removed, the battery replacement device is further used to obtain and verify the security message of the battery lock, and when the verification is successful, generate a security signal and send it to the battery charging device.

Preferably, the battery replacement device is further used to generate an alarm information when the verification is not successful.

Preferably, the battery replacement device is further used to verify a user identity and an identifier of a target battery when receiving the unlock request, and send the security message to the battery lock of the target battery;

the unlock request comprises the user identity and the identifier.

Preferably, the battery lock is arranged in the electric vehicle.

The present invention further provides a battery replacement encryption method for implementing battery replacement of electric vehicles, the battery replacement encryption method comprises the following steps:

the battery replacement device installs the battery on the electric vehicle, and sends a security message to the battery lock;

the battery lock unlocks the battery when receiving the security message, so that the battery is electrically connected to the electric vehicle.

Preferably, after the step of the battery replacement device installs the battery on the electric vehicle, the method further comprises:

the battery lock acquires a battery lock signal and sends it to the battery replacement device;

the battery lock signal indicates that the battery is installed on the electric vehicle;

the battery replacement device generates the security message when receiving the battery lock signal.

Preferably, after the step of the battery lock unlocks the battery, the method further comprises:

the battery lock stores the security message.

Preferably, before the step of the battery replacement device installs the battery on the electric vehicle the method further comprises:

the battery replacement device removes the battery from the electric vehicle;

when the battery lock obtains a battery unlock signal, the battery lock locks the battery so that the battery is electrically disconnected from the electric vehicle;

the battery unlock signal is used to indicate that the battery is removed from the electric vehicle.

Preferably, after the step of removing the battery from the electric vehicle by the battery replacement device, the method further comprises:

the battery replacement device obtains and verifies the security message of the battery lock, and when the verification is successful, generates a security signal and sends it to the battery charging device.

Preferably, when the verification of the battery replacement device is not successful, an alarm message is generated.

Preferably, the battery replacement encryption method further comprises:

when the batter replacement device receives a unlock request, verifies a user identity and an identifier of a target battery, and sends the security message to the battery lock of the target battery when the verification is successful;

the unlock request comprises the user identity and the identifier.

The positive progress effect of the present invention is that the present invention effectively supervises the battery replacement of electric vehicles, so as to ensure that the batteries of the replacement station (replacement operator) circulate in its own system, and avoid unauthorized or wrong replacement of the battery, as well as improve the security of vehicle operation.

DETAILED DESCRIPTION OF THE PREFERRED EMBODIMENT

The following examples further illustrate the present disclosure, but the present disclosure is not limited thereto.

Embodiment 1

The embodiment provides a battery lock, which is applicable for battery replacement of electric vehicles, and the battery lock is installed in the electric vehicle. The battery lock of the embodiment unlocks the battery when receiving a security message sent by an external device, so that the battery is electrically connected to the electric vehicle. Wherein the external device can be a battery replacement device or a battery replacement station.

In the embodiment, the battery lock unlocks the battery only when a security message is received to realize the electrical connection between the battery and the electric vehicle. When the user replaces the battery privately, the battery lock cannot obtain the security message and cannot unlock the installation. The battery on an electric vehicle cannot operate on an electric vehicle. Thus, effective supervision of the battery is realized, and the battery is prevented from unauthorized or wrong replacement.

Figure 1:
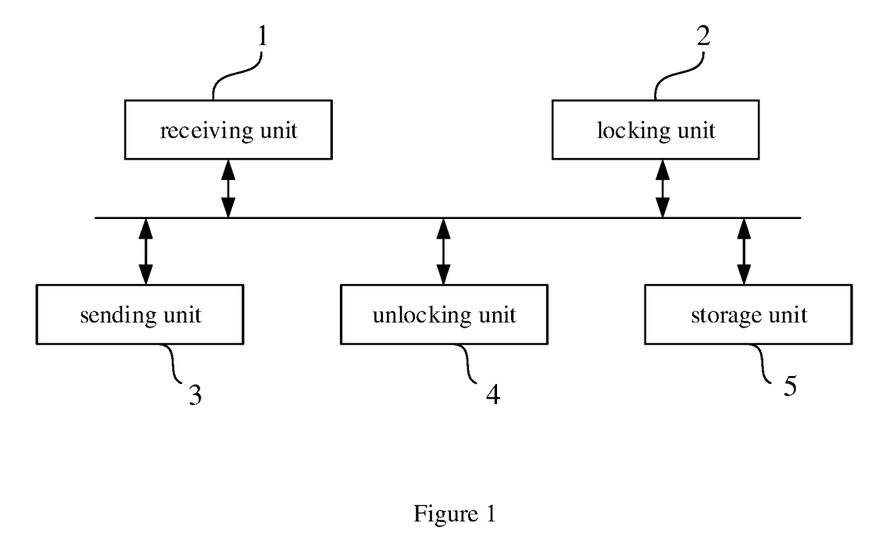
FIG. 1 is a schematic diagram of a battery lock according to Embodiment 1 of the present invention.

Specifically, as shown in FIG. 1, the battery lock of the embodiment comprises: a receiving unit 1, a locking unit 2, a sending unit 3, an unlocking unit 4, and a storage unit 5. The receiving unit 1 is electrically connected to the locking unit 2, the unlocking unit 4, and the storage unit 5, and the sending unit 3 is electrically connected to the locking unit 2 and the storage unit 5, respectively.

When the electric vehicle replace a battery in the battery replacement station, the battery replacement device of the battery station removes the battery from the electric vehicle, and a battery unlocking mechanism generates a battery unlock signal and sends it to the battery lock. Wherein the battery unlock signal is used to indicate that the battery is removed from the electric vehicle.

When the receiving unit 1 of the battery lock receives the battery unlock signal, invokes the locking unit 2 to lock the battery, so that the battery is disconnected from the electric vehicle. At the time, the electric vehicle cannot operate normally.

After the battery replacement device removes the battery from the electric vehicle, the locking unit 2 also invokes the sending unit 3 to send the security message stored in the storage unit 5 to the battery replacement device (external devices take the battery replacement device as an example). The security message was sent by the battery replacement device the last time the electric vehicle was charging the battery at the replacement station.

The battery replacement device verifies the security message to determine whether the battery is legal. If the verification is successful, the battery replacement device installs the charged battery on the electric vehicle. When it is confirmed that the battery has been installed in the electric vehicle, a battery locking mechanism generates a battery lock signal and sends it to the battery lock. Wherein the battery lock signal is used to indicate that the battery is installed on the electric vehicle.

The sending unit 3 of the battery lock sends the acquired battery lock signal to the battery replacement device, and the battery replacement device generates a new security message and sends it to the battery lock.

When the receiving unit 1 of the battery lock receives the new security message, it invokes the unlocking unit 4 to unlock the battery, so that the battery is electrically connected to the electric vehicle. At the time, the electric vehicle can operate normally.

In the embodiment, the receiving unit 1 sends the new security message to the storage unit 5 after receiving the new security message to store the new security message. When the electric vehicle replaces a battery in the battery replacement station again, the battery lock provides the new security message to the battery replacement device to verify the legitimacy of the battery. So far, the replacement of electric vehicles has been completed.

Embodiment 2

The embodiment provides a control method of a battery lock, which is applicable for battery replacement of electric vehicles. The control method of the embodiment comprises: unlocking the battery when the battery lock receives a security message sent by an external device, so that the battery is electrically connected to the electric vehicle. Wherein the external device can be a battery replacement device or a battery replacement station.

Figure 2:
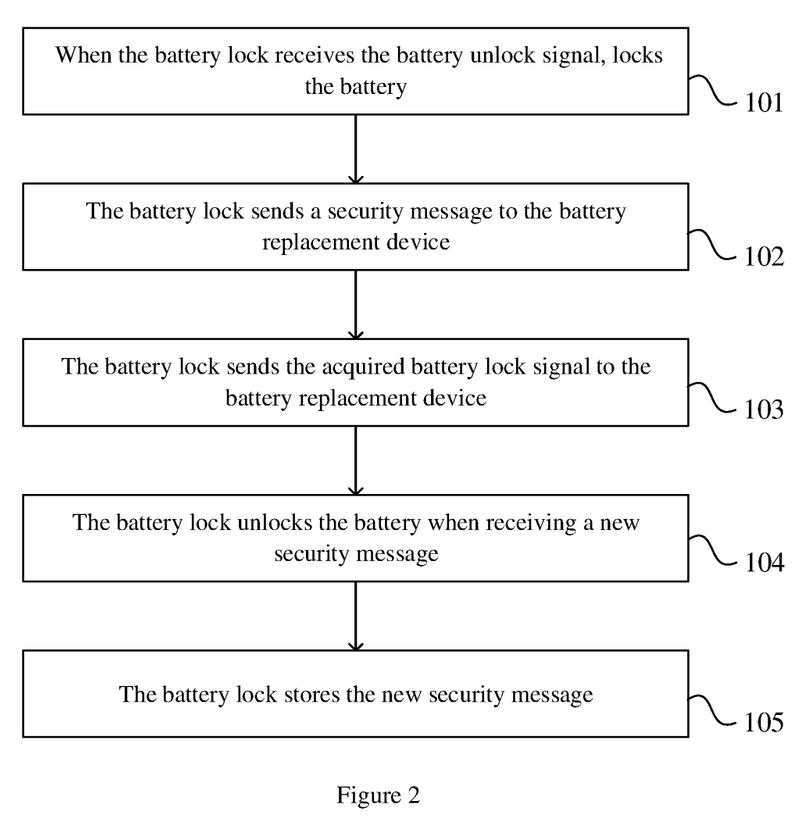
FIG. 2 is a flowchart of a control method for a battery lock according to Embodiment 2 of the present invention.

In the embodiment, as shown in FIG. 2, the control method specifically comprises the following steps:

Step 101: When the battery lock receives a battery unlock signal, locks the battery.

Wherein the battery unlock signal is used to indicate that the battery is removed from the electric vehicle. When an electric vehicle replaces a battery in a battery replacement station, the battery replacement device of the battery replacement station removes the battery from the electric vehicle, and an unlocking mechanism of the battery generates a battery unlock signal and sends it to the battery lock.

Step 102: The battery lock sends a security message to the battery replacement device.

In the embodiment, the external device is a battery replacement device as an example. The battery lock sends a security message to the battery replacement device for the battery replacement device to verify the legitimacy of the battery. The security message was sent by the battery replacement device the last time the electric vehicle was charging the battery at the station.

When the battery replacement device passes the verification, installs the charged battery on the electric vehicle. When it is confirmed that the battery has been installed in the electric vehicle, the battery locking mechanism generates a battery lock signal and sends it to the battery lock. Wherein the battery lock signal is used to indicate that the battery is installed on the electric vehicle.

Step 103: The battery lock sends the acquired battery lock signal to the battery replacement device.

The battery lock sends the battery lock signal to the battery replacement device for it to generate a new security message. The battery replacement device sends the generated new security message to the battery lock.

Step 104: The battery lock unlocks the battery when receiving a new security message sent by the battery replacement device.

After the battery lock is unlocked, the battery is electrically connected to the electric vehicle, and the electric vehicle can operate normally.

Step 105: The battery lock stores the new security message.

When the electric vehicle replaces a battery in the replacement station again, the battery lock will provide the new security message to the device to verify the legitimacy of the battery. So far, the replacement of electric vehicles has been completed.

The battery replacement encryption system of the embodiment effectively supervises the battery replacement of electric vehicles, so as to ensure that the batteries of the replacement station (replacement operator) circulate in its own system, and avoid unauthorized or wrong replacement of the battery, as well as improve the security of vehicle operation.

Embodiment 3

The embodiment provides a battery replacement device, which is used to install a battery on an electric vehicle and send a security message to a battery lock to unlock the battery, so that the battery is electrically connected to the electric vehicle.

Figure 3:
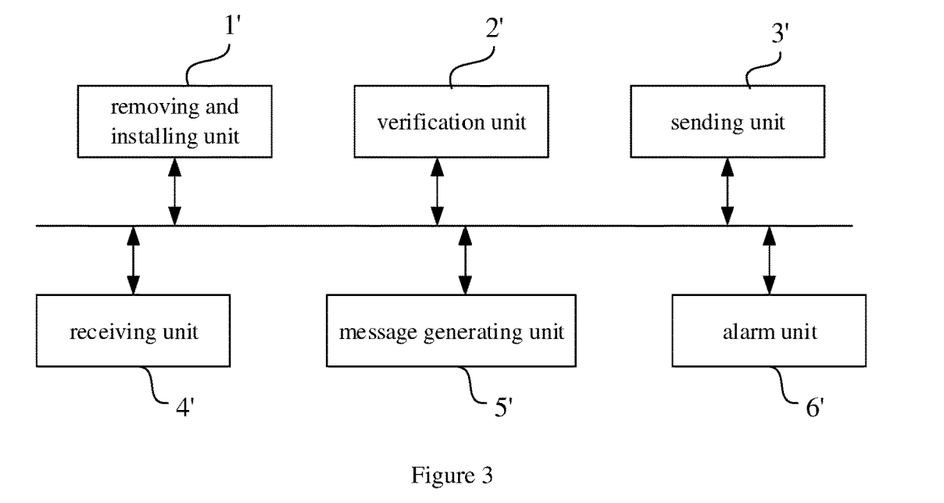
FIG. 3 is a schematic diagram of a battery replacement device according to Embodiment 3 of the present invention.

Specifically, as shown in FIG. 3, the battery replacement device of the embodiment comprises: a removing and installing unit 1', a verification unit 2', a sending unit 3', a receiving unit 4', a message generating unit 5' and an alarm unit 6'. The verification unit 2' is electrically connected to the removing and installing unit 1', the sending unit 3' and the alarm unit 6', and the message generating unit 5' is electrically connected to the sending unit 3' and the receiving unit 4', respectively.

When the electric vehicle replaces a battery at a battery replacement station, the removing and installing unit 1' of the battery replacement device removes the battery from the electric vehicle. After removing, a battery unlocking mechanism generates a battery unlock signal and sends it to the battery lock of the battery. Wherein the battery unlock signal is used to indicate that the battery is removed from the electric vehicle. When the battery lock receives the battery unlock signal, it locks the battery and disconnects the battery from the electric vehicle. At the time, the electric vehicle cannot operate normally.

After the removing and installing unit 1' removes the battery from the electric vehicle, the verification unit 2' obtains and verifies the security message of the battery lock of the battery to determine whether the battery is legal. The security message was sent to the battery lock by the battery replacement device the last time the electric vehicle was charging the battery at the battery replacement station.

If the verification unit 2' fails to verify the security message, indicating that the battery may be an inferior battery that has been replaced unauthorizedly, then the verification unit 2' invokes the alarm unit 6' to generate an alarm message, prompting that the battery is not a battery circulating in the system of the replacement station.

If the verification unit 2' passes the verification security message, indicating that the battery is a high-quality battery circulating in the battery replacement station system, the verification unit 2' invokes the sending unit 3' to send the generated security signal to the battery charging device of the battery replacement station to charge the battery.

When the verification unit 2' verifies the legitimacy of the battery, the removing and installing unit 1' installs the charged battery on the electric vehicle. When it is confirmed that the battery has been installed in the electric vehicle, a battery locking mechanism generates a battery lock signal and sends it to the battery replacement device through the battery lock. Wherein the battery lock signal is used to indicate that the battery is installed on the electric vehicle.

When the receiving unit 4' of the battery replacement device receives the battery lock signal sent by the battery lock, it invokes the message generating unit 5' to generate a new security message. The message generating unit 5' invokes the sending unit 3' to send the new security message to the battery lock to unlock the battery and electrically connect the battery to the electric vehicle. At the time, the electric vehicle can operate normally.

In the embodiment, if the battery is legal, but the electric vehicle cannot operate normally after the battery is installed in the electric vehicle, the user can send an unlock request to the battery replacement device by phone, text message, email or other methods. Wherein the unlock request comprises a user identity and an identifier. The receiving unit 4' is also used to invoke the verification unit 2' to verify the identity of the user and the identification of the target battery when receiving the unlock request, and to invoke the message generating unit 5' to generate a security message when the verification is successful. The message generating unit 5' sends a security message to the target battery to unlock the target battery.

The battery replacement device of the embodiment can send a security message to the battery lock of the battery, and the battery lock unlocks the battery only when the security message is received, so that the battery replacement device interacts with the battery lock to effectively supervise the battery replacement of electric vehicles, so as to ensure that the batteries of the replacement station (replacement operator) circulate in its own system, and avoid unauthorized or wrong replacement of the battery, as well as improve the security of vehicle operation.

Embodiment 4

The embodiment provides a control method for a battery replacement device, which is used to replace the battery of an electric vehicle. The control method comprises: the battery replacement device installs the battery on the electric vehicle, and sends a security message to a battery lock to unlock the battery, so that the battery is connected to the electric vehicle electrically.

Figure 4:
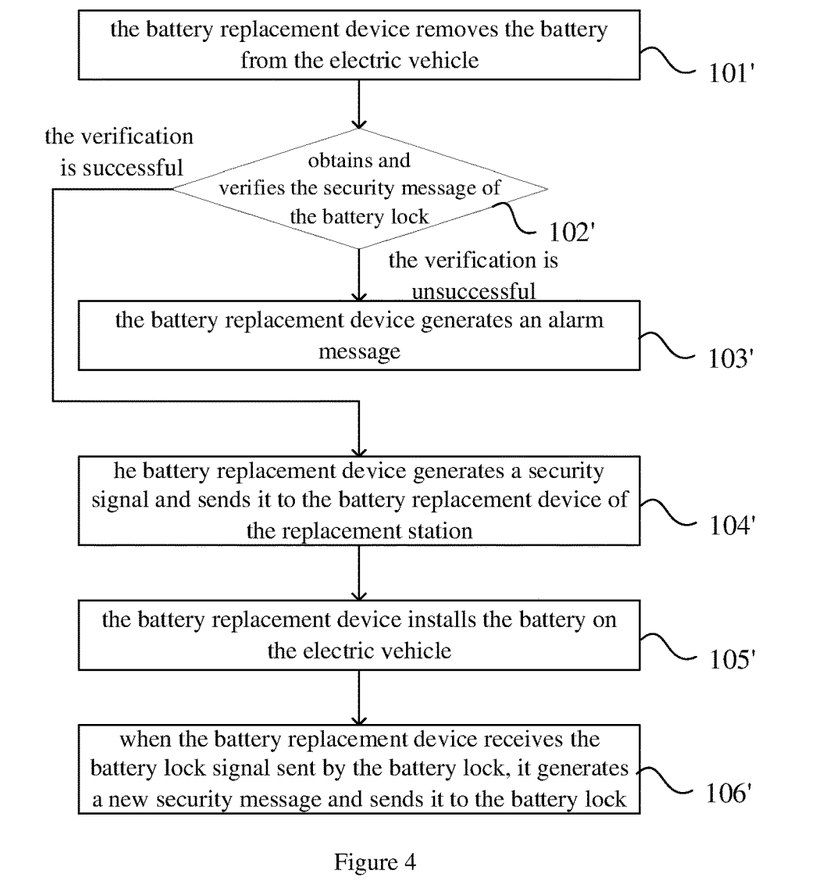
FIG. 4 is a flowchart of a control method of a battery replacement device according to Embodiment 4 of the present invention.

In the embodiment, as shown in FIG. 4, the control method specifically comprises the following steps:

Step 101': The battery replacement device removes the battery from the electric vehicle.

When the electric vehicle replaces a battery at a battery replacement station, the battery replacement device removes the battery from the electric vehicle. After removing the battery, a battery unlocking mechanism generates a battery unlock signal and sends it to the battery lock of the battery. Wherein the battery unlock signal is used to indicate that the battery is removed from the electric vehicle. When the battery lock receives the battery unlock signal, it locks the battery and disconnects the battery from the electric vehicle. At the time, the electric vehicle cannot operate normally.

Step 102': The battery replacement device obtains and verifies the security message of the battery lock.

If the verification is unsuccessful, indicating that the battery may be an inferior battery that has been unauthorized replaced, go to step 103'.

Step 103': The battery replacement device generates an alarm message.

To remind that the battery is not a battery circulating in the system of the replacement station.

If the verification is successful, indicating that the battery is a high-quality battery circulating in the system of the battery replacement station, go to step 104'.

Step 104': The battery replacement device generates a security signal and sends it to the battery replacement device of the replacement station to charge the battery. And go to step 105'.

Step 105': The battery replacement device installs the battery on the electric vehicle.

When it is confirmed that the battery has been installed in the electric vehicle, the battery locking mechanism generates a battery lock signal and sends it to the battery replacement device through the battery lock. Wherein the battery lock signal is used to indicate that the battery is installed on the electric vehicle.

Step 106': When the battery replacement device receives the battery lock signal sent by the battery lock, it generates a new security message and sends it to the battery lock.

The battery lock unlocks the battery when receiving the new security message, so that the battery is electrically connected to the electric vehicle, at the time the electric vehicle can operate normally.

In the embodiment, if the battery is legal, but the electric vehicle cannot operate normally after the battery is installed in the electric vehicle, the user can send an unlock request to the battery replacement device by phone, text message, email or other methods. Wherein the unlock request comprises a user identity and an identifier. Specifically, the control method also comprises:

When the battery replacement device receives the unlock request, it verifies the user identity and the identifier of a target battery, and sends a security message to the battery lock of the target battery when the verification is successful, so as to unlock the target battery.

The embodiment effectively supervises the battery replacement of electric vehicles, so as to ensure that the batteries of the replacement station (replacement operator) circulate in its own system, and avoid unauthorized or wrong replacement of the battery, as well as improve the security of vehicle operation.

Embodiment 5

Figure 5:
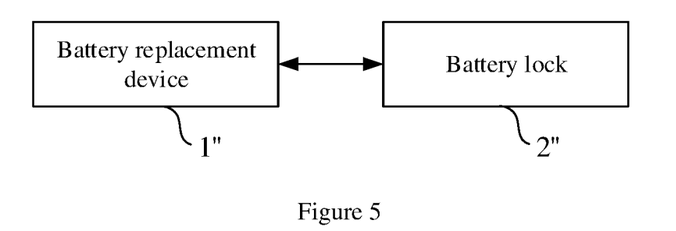
FIG. 5 is a schematic diagram of a battery replacement encryption system according to Embodiment 5 of the present invention.

The embodiment provides a battery replacement encryption system for battery replacement of electric vehicles. As shown in FIG. 5, the battery replacement encryption system of the embodiment comprises: a battery replacement device 1" and a battery lock 2". The battery replacement device 1" is electrically connected to the battery lock 2". The battery lock is installed in the electric vehicle.

The following describes the working principle of the battery replacement encryption system:

The battery replacement device removes the battery from the electric vehicle that needs to be replaced. After the battery is removed from the electric vehicle, an unlocking mechanism of the battery generates a battery unlock signal and sends it to the battery lock. Wherein the battery unlock signal is used to indicate that the battery is removed from the electric vehicle. When the battery lock receives the battery unlock signal, it locks the battery and disconnects the battery from the electric vehicle. At the time, the electric vehicle cannot operate normally.

After the battery is removed from the electric vehicle, the battery replacement device obtains and verifies the security message of the battery lock of the battery to determine whether the battery is legal. The security message was sent by the battery replacement device the last time the electric vehicle was charging the battery at the replacement station.

If the battery replacement device fails to verify the security message, indicating that the battery may be an inferior battery that has been unauthorizedly replaced, the battery replacement device generates an alarm message indicating that the battery is not a battery circulating in the system of the replacement station.

If the battery replacement device successfully verifies the security message, indicating that the battery is a high-quality battery circulating in the battery replacement station system, the device generates a security signal and sends it to the battery charging device of the station to charge the battery.

The battery replacement device installs the charged battery on the electric vehicle. When it is confirmed that the battery has been installed on the electric vehicle, a battery lock mechanism generates a battery lock signal and sends it to the battery lock. Wherein the battery lock signal is used to indicate that the battery is installed on the electric vehicle.

The battery lock sends the acquired battery lock signal to the battery replacement device, and the battery replacement device generates a new security message and sends it to the battery lock when receiving the battery lock signal. The battery lock unlocks the battery when receiving a new security message, so that the battery is electrically connected to the electric vehicle, and the electric vehicle can operate normally at the time.

In the embodiment, the battery lock is also used for the new storage security message. When the electric vehicle replace a battery in the battery station again, the new security message is provided to the battery device to verify the legitimacy of the battery.

In the embodiment, if the battery is legal, but the electric vehicle cannot operate normally after the battery is installed in the electric vehicle, the user can send an unlock request to the battery replacement station by phone, SMS, email or other methods. Wherein the unlock request comprises a user identity and an identifier. When receiving the unlock request, the battery replacement device of the station verifies the user identity and the identifier of a target battery, and sends a security message to the battery lock of the target battery when the verification is successful, so as to unlock the target battery.

The battery replacement encryption system of the embodiment effectively supervises the battery replacement of electric vehicles, so as to ensure that the batteries of the replacement station (replacement operator) circulate in its own system, and avoid unauthorized or wrong replacement of the battery, as well as improve the security of vehicle operation.

Embodiment 6

Figure 6:
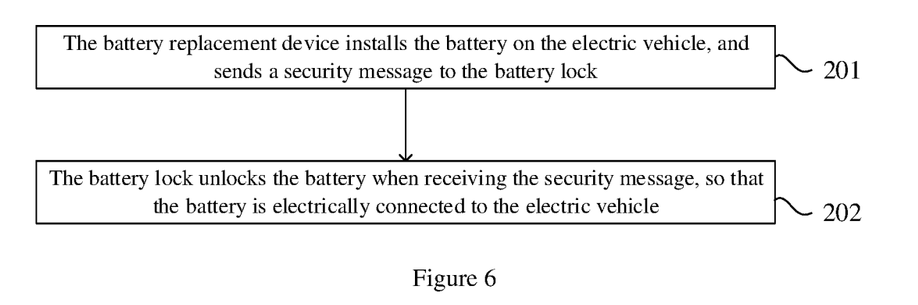
FIG. 6 is a flowchart of a battery replacement encryption method according to Embodiment 6 of the present invention.

The embodiment provides a battery replacement encryption method for realizing battery replacement of electric vehicles. As shown in FIG. 6, the battery replacement encryption method comprises the following steps:

Step 201: The battery replacement device installs the battery on the electric vehicle, and sends a security message to the battery lock.

Step 202: The battery lock unlocks the battery when receiving the security message, so that the battery is electrically connected to the electric vehicle.

In the embodiment, the battery lock unlocks the battery only when the battery replacement device sends a security message to the battery lock, but when a user replaces the battery privately, the battery lock cannot obtain the security message and cannot unlock the battery installed in the electric vehicle, so that the electric vehicle cannot run. Thus, it effectively supervises the battery and avoid the battery to be unauthorizedly or wrongly replaced.

Embodiment 7

Figure 7:
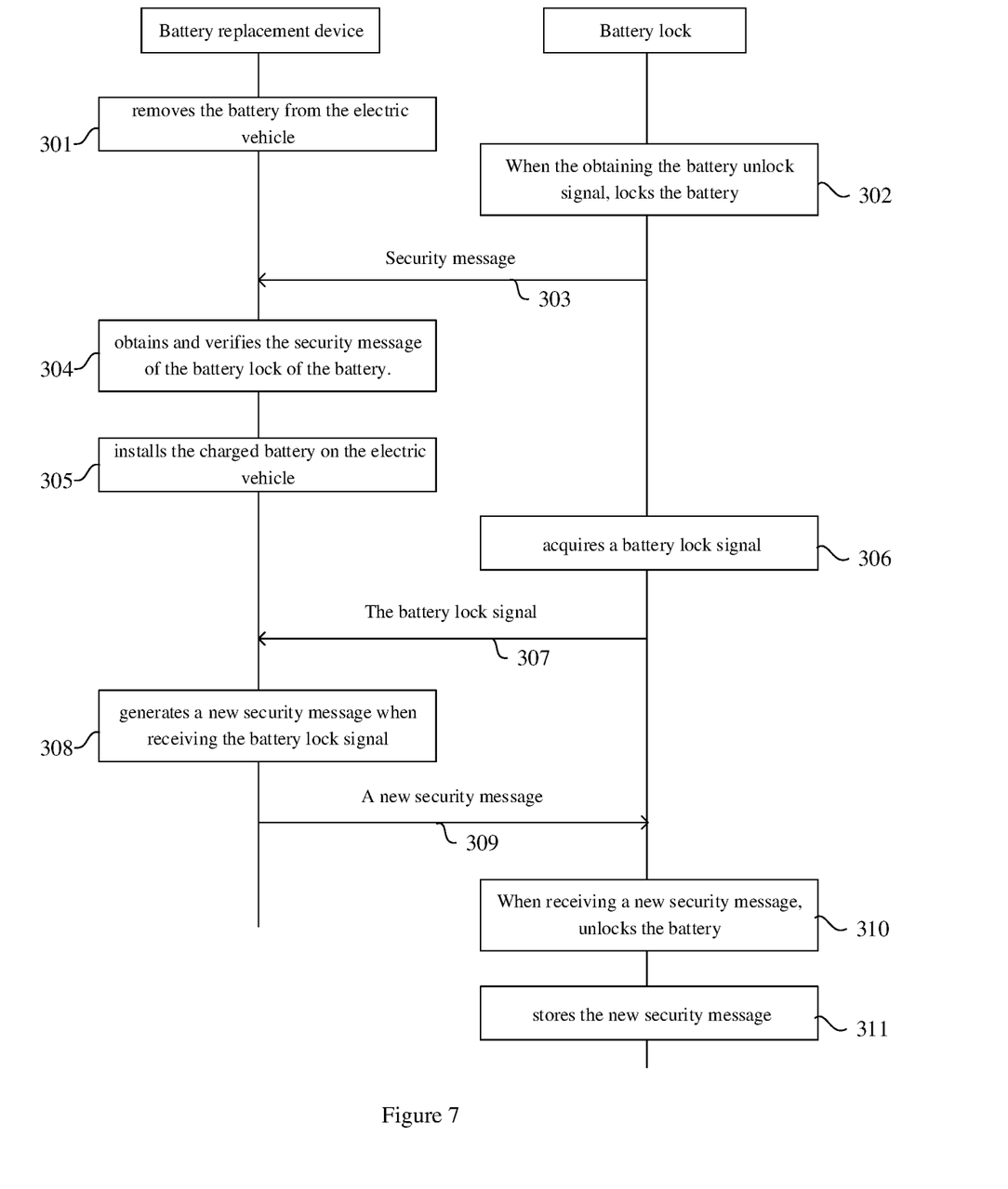
FIG. 7 is a flowchart of a battery replacement encryption method according to Embodiment 7 of the present invention.

Embodiment 7 is basically the same as Embodiment 6, but the difference is that when the electric vehicle replaces a battery, the battery replacement device further verifies its legitimacy after removing the battery. The details of the encryption method for battery replacement in the embodiment as shown in FIG. 7:

Step 301: The battery replacement device removes the battery from the electric vehicle.

After the battery is removed from the electric vehicle, an unlocking mechanism of the battery generates a battery unlock signal and sends it to the battery lock. Wherein the battery unlock signal is used to indicate that the battery is removed from the electric vehicle.

Step 302: When the battery lock obtains the battery unlock signal, locks the battery.

At the time, after the battery is locked by the battery lock, the battery is disconnected from the electric vehicle, and the electric vehicle cannot operate normally at the time.

Step 303: The battery lock sends a security message to the battery replacement device.

Wherein the security message was sent by the battery replacement device the last time the electric vehicle was charging the battery at the station.

Step 304: The battery replacement device obtains and verifies the security message of the battery lock of the battery.

The purpose of step 304 is to verify whether the battery is legal and whether it has been unauthorizedly replaced. In step 304, if the verification is unsuccessful, indicating that the battery may be a inferior battery that has been unauthorizedly replaced, and the battery replacement device generates an alarm message indicating that the battery is not a battery circulating in the system; if the verification is successful, indicating that the battery is a high-quality battery circulating in the system of the station, the battery replacement device generates a security signal and sends it to the battery charging device of the battery replacement station to charge the battery, and go to step 305.

Step 305: The battery replacement device installs the charged battery on the electric vehicle.

When it is confirmed that the battery has been installed in the electric vehicle, the battery locking mechanism generates a battery lock signal and sends it to the battery lock. Wherein the battery lock signal is used to indicate that the battery is installed on the electric vehicle.

Step 306: The battery lock acquires a battery lock signal.

Step 307: The battery lock sends the battery lock signal to the battery replacement device.

Step 308: The battery replacement device generates a new security message when receiving the battery lock signal.

Step 309: The battery replacement device sends the new security message to the battery lock.

Step 310: When receiving a new security message, the battery lock unlocks the battery.

After the battery lock is unlocked, the battery is electrically connected to the electric vehicle, and the electric vehicle can operate normally.

In the embodiment, after step 310, it further comprises:

Step 311: The battery lock stores the new security message.

When the electric vehicle replace a battery in the battery station again, the new security message is provided to the battery device, and the battery device executes step 304, that is, verifies the legitimacy of the battery.

In the embodiment, if the battery is legal, but the electric vehicle cannot operate normally after the battery is installed in the electric vehicle, the user can send an unlock request to the station by phone, SMS, email or other methods. Wherein the unlock request comprises a user identity and an identifier. Specifically, the encryption method for battery replacement also comprises:

When receiving the unlock request, the battery device of the station verifies the user identity and the identifier of a target battery, and sends a security message to the battery lock of the target battery when the verification is successful, so as to unlock the target battery.

The encryption method for battery replacement in the embodiment effectively supervises the battery replacement of electric vehicles, so as to ensure that the batteries of the replacement station (replacement operator) circulate in its own system, and avoid unauthorized or wrong replacement of the battery, as well as improve the security of vehicle operation.

Although the specific embodiments of the present invention are described above, those skilled in the art should understand that this is only an example, and the protection scope of the present invention is defined by the appended claims. Those skilled in the art can make various amendments or modifications to these embodiments without departing from the principle and essence of the present invention, but these amendments and modifications all fall within the protection scope of the present invention.

What is claimed is:

1. A battery lock, wherein the battery lock is applicable for battery replacement of electric vehicles;

the battery lock is used to unlock the battery when receiving a security message sent by an external device, so that the battery is electrically connected to the electric vehicle;

wherein the battery lock comprises: a sending unit;

the sending unit is used to send an acquired battery lock signal to the external device to generate the security message;

the battery lock signal is used to indicate that the battery is installed on the electric vehicle.

2. The battery lock of claim 1, wherein the battery lock further comprises a storage unit;

the storage unit is used to store the security message.

3. The battery lock of claim 1, wherein the battery lock further comprises: a receiving unit and a locking unit;

the receiving unit is used to invoke the locking unit when receiving a battery unlock signal;

the locking unit is used to lock the battery so that the battery is electrically disconnected from the electric vehicle;

the battery unlock signal is used to indicate that the battery is removed from the electric vehicle.

4. The battery lock according to claim 3, wherein after locking the battery, the locking unit is further used to invoke the sending unit;

the sending unit is further used to send the security message to the external device.

5. The battery lock according to claim 1, wherein the battery lock is arranged in the electric vehicle;

and/or, the external device is a battery replacement device or a battery replacement station.

6. A battery replacement device for replacing a battery of an electric vehicle, wherein the battery replacement device is used to install the battery on the electric vehicle and send a security message to a battery lock to unlock the battery, so that the battery is electrically connected to the electric vehicle;

wherein the battery replacement device comprises: a receiving unit and a message generating unit;

the receiving unit is used to invoke the message generating unit when receiving a battery lock signal sent by the battery lock;

the message generating unit is used to generate the security message;

the battery lock signal is used to indicate that the battery is installed on the electric vehicle.

7. The battery replacement device according to claim 6, wherein the battery replacement device further comprises: a removing and installing unit;

the removing and installing unit is used to remove the battery from the electric vehicle.

8. The battery replacement device according to claim 7, wherein the battery replacement device further comprises: a verification unit;

after the battery is removed, the verification unit is used to obtain and verify the security message of the battery lock, and when the verification is successful, send a security signal to the battery replacement device.

9. The battery replacement device of claim 8, wherein the battery replacement device further comprises: an alarm unit;

the verification unit is further used to invoke the alarm unit when the verification is not successful;

the alarm unit is used to generate an alarm information.

10. The battery replacement device of claim 8, wherein the verification unit is further used to verify a user identity and an identifier of a target battery when receiving the unlock request, and send the security message to the target battery when the verification is successful;

the unlock request comprises the user identity and the identifier.

11. A battery replacement encryption system for battery replacement of electric vehicles, wherein the battery replacement encryption system comprises: a battery replacement device and a battery lock;

the battery replacement device is used to install the battery on the electric vehicle and send a security message to the battery lock;

the battery lock is used to unlock the battery when receiving the security message, so that the battery is electrically connected to the electric vehicle;

wherein the battery lock is further used to obtain a battery lock signal and send it to the battery replacement device;

the battery lock signal is used to indicate that the battery is installed on the electric vehicle;

the battery replacement device is used to generate the security message when receiving the battery lock signal.

12. The battery replacement encryption system of claim 11, wherein the battery lock is further used to store the security message.

13. The battery replacement encryption system of claim 11, wherein the battery replacement device is also used to remove the battery from the electric vehicle;

the battery lock is further used to lock the battery when obtaining a battery unlock signal, so that the battery is electrically disconnected from the electric vehicle;

the battery unlock signal is used to indicate that the battery is removed from the electric vehicle.

14. The battery replacement encryption system of claim 13, wherein after the battery is removed, the battery replacement device is further used to obtain and verify the security message of the battery lock, and when the verification is successful, generate a security signal and send it to the battery charging device.

15. The battery replacement encryption system according to claim 14, wherein the battery replacement device is further used to generate an alarm information when the verification is not successful.

16. The battery replacement encryption system according to claim 11, wherein the battery replacement device is further used to verify a user identity and an identifier of a target battery when receiving the unlock request, and send the security message to the battery lock of the target battery;

the unlock request comprises the user identity and the identifier.

* * * * *